US011797780B1

(12) United States Patent
Finegan et al.

(10) Patent No.: US 11,797,780 B1
(45) Date of Patent: Oct. 24, 2023

(54) CONTEXT-BIASED ARTIFICIAL INTELLIGENCE VIDEO GENERATION

(71) Applicant: Intuit Inc., Mountain View, CA (US)

(72) Inventors: Corinne Finegan, Los Altos, CA (US); Richard Becker, Edmonton (CA); Sanuree Gomes, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/977,980

(22) Filed: Oct. 31, 2022

(51) Int. Cl.
*G06F 40/40* (2020.01)
*G06T 11/60* (2006.01)

(52) U.S. Cl.
CPC .............. *G06F 40/40* (2020.01); *G06T 11/60* (2013.01)

(58) Field of Classification Search
USPC ......................................... 704/3, 7–10, 257
See application file for complete search history.

(56) References Cited

U.S. PATENT DOCUMENTS

| 2020/0092237 | A1* | 3/2020 | Sharifi | H04N 21/4394 |
| 2020/0137441 | A1* | 4/2020 | Lee | G06N 20/00 |
| 2020/0213680 | A1* | 7/2020 | Ingel | H04N 21/8106 |
| 2020/0320116 | A1* | 10/2020 | Wu | H04L 51/10 |

OTHER PUBLICATIONS

Herrman, John, "AI Art is Here and the World is Already Different: How we work—even think—changes when we can instantly command convincing images into existence"; New York, Intelligencer; Sep. 19, 2022 (12 pages).

* cited by examiner

*Primary Examiner* — Leonard Saint-Cyr
(74) *Attorney, Agent, or Firm* — Ferguson Braswell Fraser Kubasta PC

(57) ABSTRACT

A method includes receiving a set of text documents. The method also includes generating a summary of the set of text documents by a set of large language machine learning models. The method further includes generating a set of keywords from the summary by the set of large language machine learning models. The method additionally includes generating an image prompt from the set of keywords by the set of large language machine learning models. The method also includes generating a set of images from the image prompt by a text-to-image machine learning model. The method further includes generating a video clip from the set of images. The method additionally includes presenting the video clip.

17 Claims, 7 Drawing Sheets

CONTEXT-BIASED ARTIFICIAL INTELLIGENCE VIDEO GENERATION

BACKGROUND

Small and medium sized businesses (SMBs) rarely have the budget or expertise to leverage modern social media platforms to generate sales and stay engaged with customers. The costs, creativity, technical know-how and time requirements often prevent SMBs from taking advantage of the marketing potential of these social networks. Publishing a promotional video on popular social media platforms takes time and technical expertise, both of which may be lacking for average SMB owners. Artificial intelligence (AI) may help SMBs to deliver hassle-free and highly engaging and effective marketing content to customers.

SUMMARY

In general, in one aspect, one or more embodiments related to a method. The method includes receiving a set of text documents. The method also includes generating a summary of the set of text documents by a set of large language machine learning models. The method further includes generating a set of keywords from the summary by the set of large language machine learning models. The method additionally includes generating an image prompt from the set of keywords by the set of large language machine learning models. The method also includes generating a set of images from the image prompt by a text-to-image machine learning model. The method further includes generating a video clip from the set of images. The method additionally includes presenting the video clip.

In general, in one aspect, one or more embodiments related to a system that includes a computer processor, memory, and instructions stored in the memory. The instructions are executable by the computer processor to cause the computer processor to perform a method. The method includes receiving a set of text documents. The method also includes generating a summary of the set of text documents by a set of large language machine learning models. The method further includes generating a set of keywords from the summary by the set of large language machine learning models. The method additionally includes generating an image prompt from the set of keywords by the set of large language machine learning models. The method also includes generating a set of images from the image prompt by a text-to-image machine learning model. The method further includes generating a video clip from the set of images. The method additionally includes presenting the video clip.

In general, in one aspect, one or more embodiments related to a computer program product comprising non-transitory computer-readable program code that, when executed by a computer processor of a computing system, cause the computing system to perform a method. The method includes receiving a set of text documents. The method also includes generating a summary of the set of text documents by a set of large language machine learning models. The method further includes generating a set of keywords from the summary by the set of large language machine learning models. The method additionally includes generating an image prompt from the set of keywords by the set of large language machine learning models. The method also includes generating a set of images from the image prompt by a text-to-image machine learning model. The method further includes generating a video clip from the set of images. The method additionally includes presenting the video clip.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to automatically creating video clips targeted for publication on social media platforms. The video clip uses a series of images that are dynamically generated using a large pre-trained Transformer Image Based Model (TIBM).

See information can be provided directly by the user, or it can be scraped from a website, social media or other sources of natural language that are not specific to the application. For example, the seed information can include a brief textual description that may be a series of keywords, client reviews, corporate description, tag lines from a marketing campaign or marketing material. The initial seed information is augmented using a series of related keywords that are known to directly affect the generated image. These keywords can be determined manually, or based upon collections generated by c machine learning models.

Figure 1:
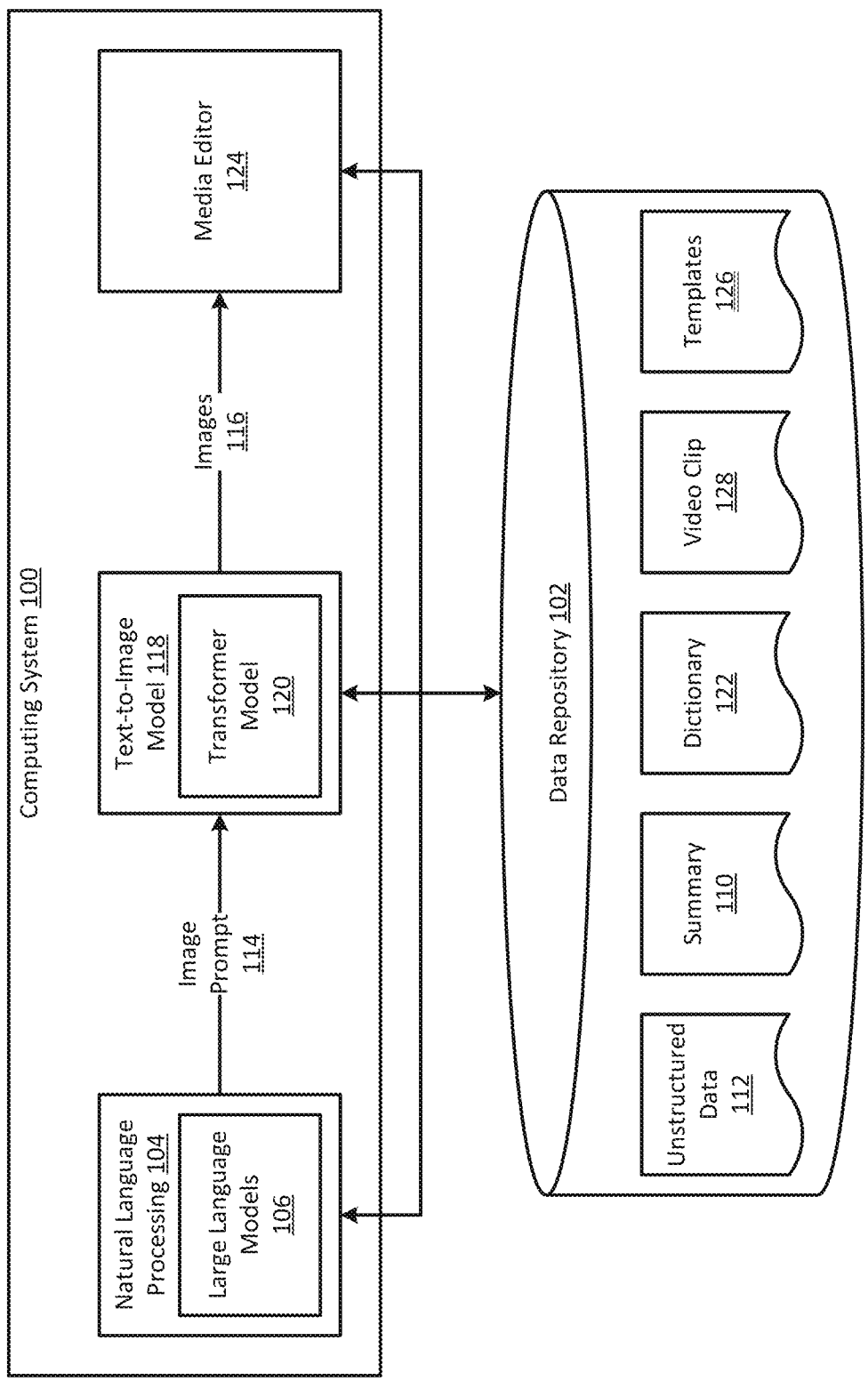
FIG. 1 illustrates an example system in accordance with the disclosed embodiments.

A series of natural language processing models process the seed information to generate an image prompt for a text-to-image Machine learning model degenerate a series of relevant images. Rather than being pulled from a pre-existing library or stock collection, the images themselves are dynamically generated by the text-to-image based upon the textual inputs. The generated images are then further processed to create a video clip suitable for publication to a social media platform FIG. 1 is a diagram of a system in accordance with one or more embodiments. As shown in FIG. 1, the system includes a computing system (100), which is connected to a data repository (102). The computing system (100) may be, for example, the computing system described below in reference in FIGS. 7A and 7B.

In one or more embodiments of the invention, the data repository (102) is any type of storage unit and/or device (e.g., a file system, database, data structure, or any other storage mechanism) for storing data. Further, the data repository (102) may include multiple different, potentially heterogeneous, storage units and/or devices.

Computing system (100) includes natural language processing (104). Natural language processing (104) is a computer processing function that combines computational linguistics with statistical, machine learning, and/or deep learning models to enable the processing of human language to "understand" meaning, intent and/or sentiment. Text generation is a sub-task within natural language processing.

Natural language processing (104) may include one of several different kinds of deep learning or gradient-based machine learning models. "Deep learning" is, itself, a type of machine learning model. For example, the Natural language processing (104) be a neural network, a recurrent neural network (RNN), a conditional random field (CRF), or other kinds of deep learning networks. In a specific example, natural language processing (104) is one or more large language models (106).

As used herein, a "language model" is a machine learning model that determines the probability of a given sequence of words occurring in a sentence. Large language models (106) are language models trained on enormous amount of data. For example, large language models are trained on more than a first threshold amount of data and have more than a second threshold number of parameters, where the first threshold is a gigabyte, and the second threshold is a million. For example, a large language model may be trained on a gigabyte to terabyte amount of text data and have over billions of parameters. For example, OpenAI's generative pretrained transformer 3 (GPT-3) model. GPT-3 is the largest language model known at the time with 175 billion parameters trained on 570 gigabytes of text. As used herein, a "parameter" refers to a value the model can change independently based on historical training data. At a basic level, parameters define the skill of the model on a problem, such as generating text.

Data repository (102) may store a summary (110) of unstructured data (112). As understood in the art, unstructured data (112) is data that does not conforms to a pre-defined data model. Specifically, the unstructured data does not conform with a pre-defined or known pattern of information. Unstructured data (112) can include data formats such as hypertext markup language (HTML), webpages, and/or social media. The summary (110) is a natural language summarization of unstructured data (112) generated by natural language processing (104), and may consist of keywords concepts or concepts recognized from the unstructured data (112). The summary (110) can be reintroduced as input to the machine learning models of natural language processing (104) to generate an image prompt (114).

An image prompt (114) is natural language text generated by natural language processing (104) using summary (110) as input. The image prompt (114) can include keywords, concepts, categories, semantics, and emotions identified from the summary (110) using natural language processing sub-tasks such as text classification, entity extraction, named entity recognition (NER), sentiment analysis, and summarization. The text in image prompt (114) can be supplemented with additional related language according to the relationships defined in dictionary (122).

The natural language text in the image prompt (114) provides the input parameters that delineate a context of the problem to be solved. In other words, the image prompt (114) describes a set of desired aesthetics for images (116) generated by text-to-image models (118).

Text-to-image model (118) is one or more machine learning models trained to generate digital images from natural language descriptions. A large collection of potentially noisy text-image pairs, wherein the text describes the related image, is used as a training corpus. Each image in the training corpus is tokenized into a sequence of discrete rasterized units using an image tokenizer such as Discrete variational autoencoders (dVAE) or Vector Quantized-Variational AutoEncoder (VQ-VAE). Taking text as input, the transformer model (120) is trained using next-token prediction of rasterized image latent codes generated from the image tokenizer.

Visual tokenization essentially unifies the view of text and images so that both can be treated simply as sequences of discrete tokens. The transformer model (120) learns the relationship between tokenized language inputs and visual outputs. At inference time, the transformer model (120) autoregressively samples image tokens, which are then decoded into pixels to generate images (116).

The user computing system (100) includes a media editor (124) in accordance with one or more embodiments. The media editor (124) is a software application written in any programming language that includes executable instructions stored in some sort of memory. The instructions, when executed by one or more processors, enable a device to perform the functions described in accordance with one or more embodiments. In one or more embodiments, the media editor (124) is capable of assisting a user with the creation of multimedia content suitable for publication to a social media platform. For example, media editor (124) may include functionality to arrange, modify (e.g., edit), or otherwise manipulate, label, delete, present, and store images (116) generated by text-to-image model (118).

The media editor (124) may include a user interface (UI) (not shown) for receiving input from a user and transmitting output to the user. For example, the UI may be a graphical user interface or other user interface. The UI may be rendered and displayed within a local desktop software application, or the UI may be generated by a remote web server and transmitted to a user's web browser executing locally on a desktop or mobile device.

In one embodiment, media editor (124) may use one or more pre-defined templates (126) to help guide users through creation of a video clip (126). A template may be a pre-set series of images slots and transitions into which images (116) can be inserted to generate a video clip (128) make a professionally designed montage, such as a book or video. In some embodiments, templates (126) may further be used to define the pace and pattern of a montage set of images (116) with a corresponding soundtrack.

Figure 2:
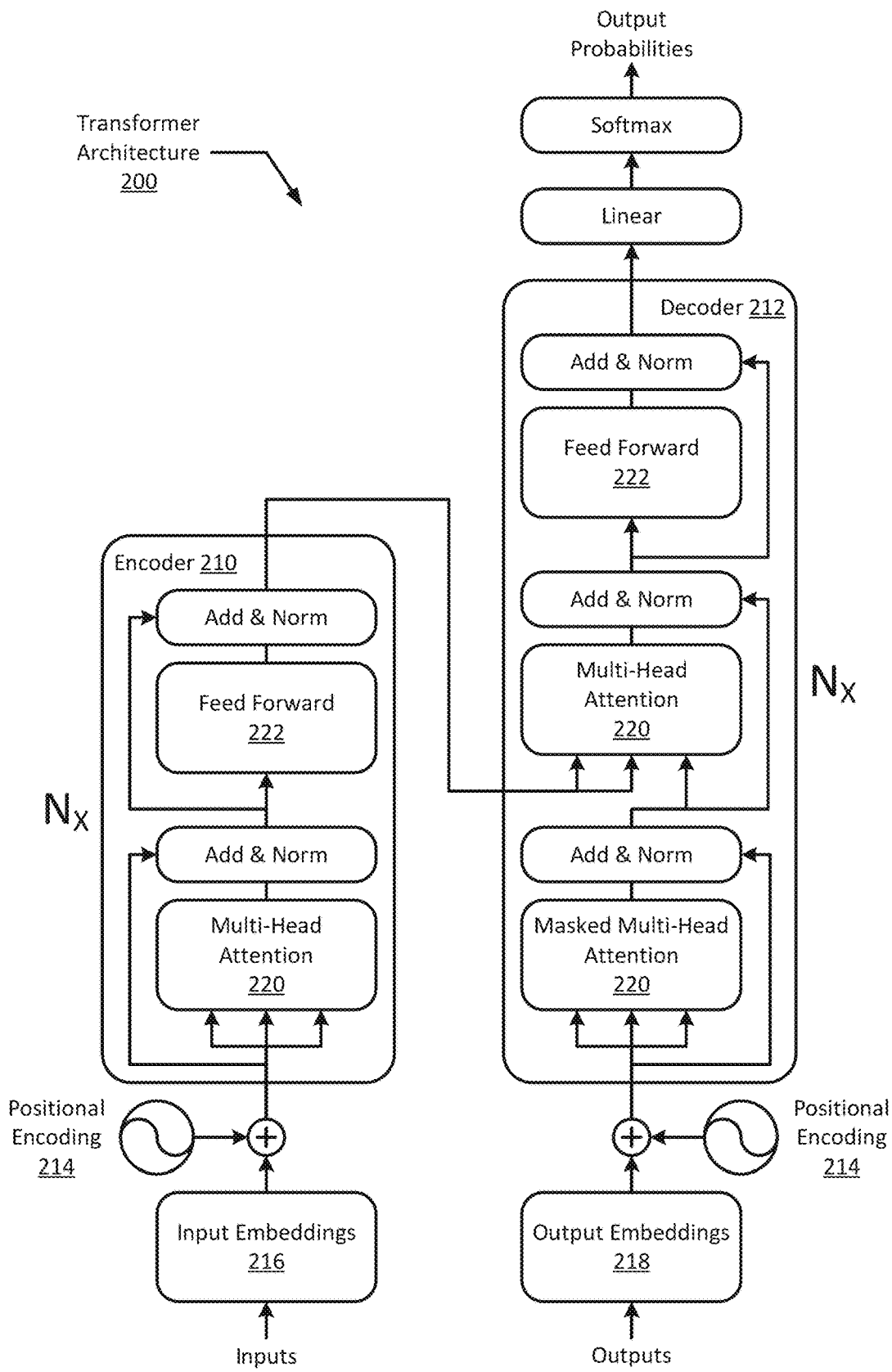
FIG. 2 illustrates a transformer architecture, in accordance with one or more embodiments.

FIG. 2 illustrates a transformer architecture. Transformer architecture (200) can be used to implement the text-to-image model (118) of FIG. 1. The transformer, in comparison to recurrent neural networks (RNN), is less prone to suffering from the vanishing gradient problem which is characteristic of networks using gradient-based optimization techniques (i.e., reduced efficacy due to the earlier layers learning being slower than the learning of later layers due to temporal information decay).

The transformer architecture (200) relies on a self-attention (intra-attention) mechanism, thereby eliminating the recurrent operations computed in Recurrent Neural Networks, which may be used to compute the latent space representation of both the encoder (210) and decoder (212) sides. Positional encoding (214) is added to the input and output embeddings (216, 218) with the absence of recurrence. The positional information, which is similar to a time-step in a recurrent network, provides the Transformer network with the order of input and output sequences. A combination of absolute positional encoding and relative positional information may be used. Input from the previously generated symbol is auto-regressively used by the model for the next prediction which is organized as a stack of encoder-decoder networks. In addition, uniform layers compose both the encoder (210) and decoder (212), and each layer is built of two sublayers: a multi-head self-attention layer (220) and a position-wise feed-forward network (FFN) layer (222). The multi-head sub-layer (220) enables the use of multiple attention functions with an equivalent cost of utilizing attention, while the FFN sub-layer (222) uses a fully connected network to process the attention sublayers. The FFN applies multiple linear transformations on each position and a Rectified Linear Unit (ReLU) which extends the self-attention mechanism to efficiently consider representations of the relative positioning (i.e., distances between sequence elements). An efficient implementation of a relation-aware self-attention mechanism is, thus, achieved.

In one embodiment of the disclosure, the transformer architecture is a generative pretrained transformer model, such as OpenAI's GPT-3, Nvidia's Megatron-LM, or Microsoft's Turing-NLG, that utilize massive data sets and scaling of the transformer architecture. For example, the GPT-3 training data set includes results from a massive web crawl. This volume of data allows the expansion of GPT-3 to 175 billion parameters using 96 attention layers, each with a 96×128 dimension head, enabling few or zero-shot training paradigms. By prompting the model with a few response paradigms, the GPT-3 model understands the context, produces results, and can structure its response automatically, without any parameter retraining.

In one embodiment of the disclosure, the text-to-image transformer architecture is a generative pretrained transformer model, such as OpenAI's DALL-E built on the GPT-3 architecture. The Dall-E transformer model converts text to a latent image space, and a Variational Encoder/Decoder model transform the latent image space to an actual Image.

While FIGS. 1-2 shows a configuration of components, other configurations may be used without departing from the scope of the invention. For example, various components may be combined to create a single component. As another example, the functionality performed by a single component may be performed by two or more components.

Figure 3:
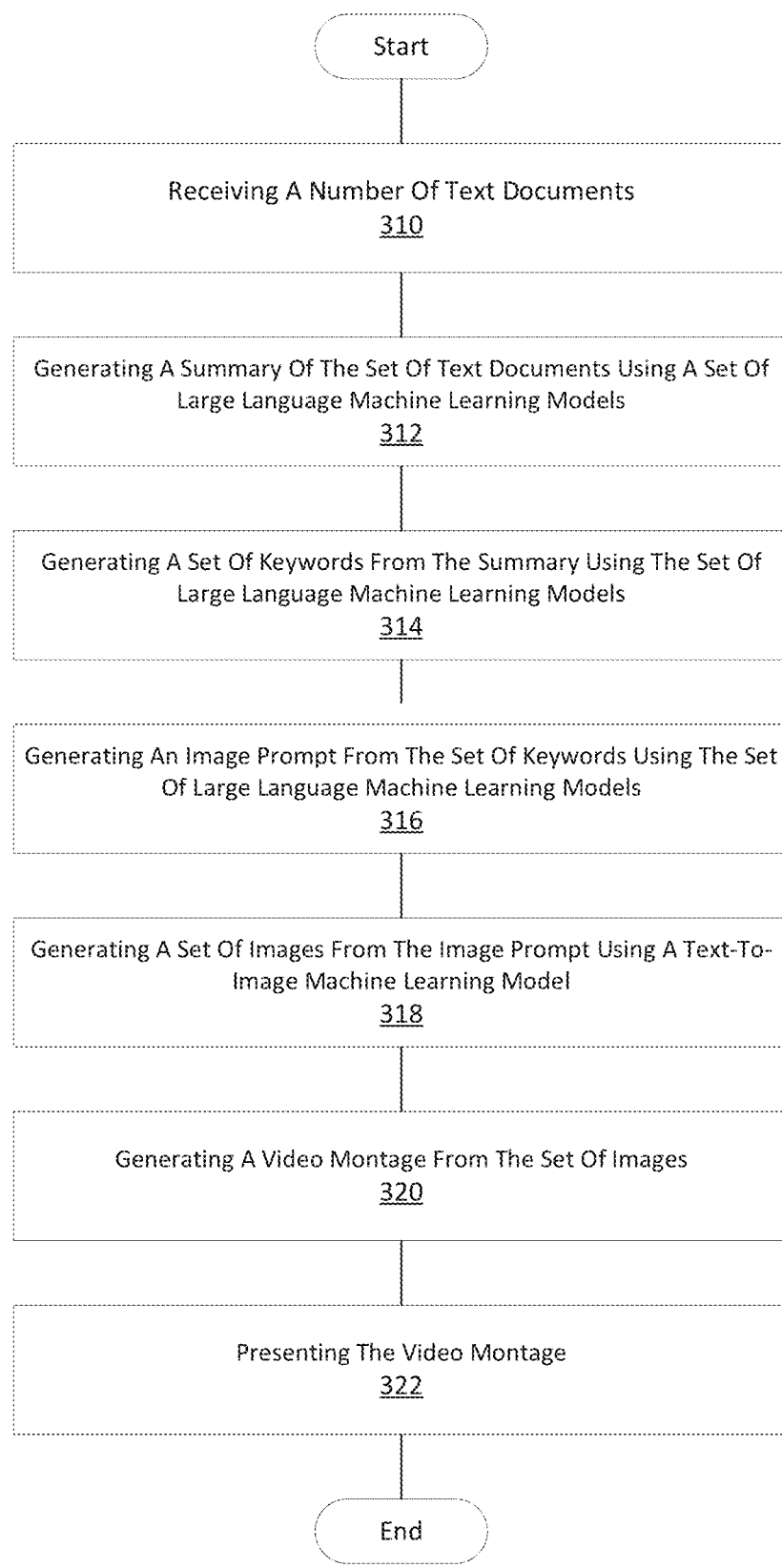
FIG. 3 shows a flowchart of a process in accordance with one or more embodiments.
Figure 5:
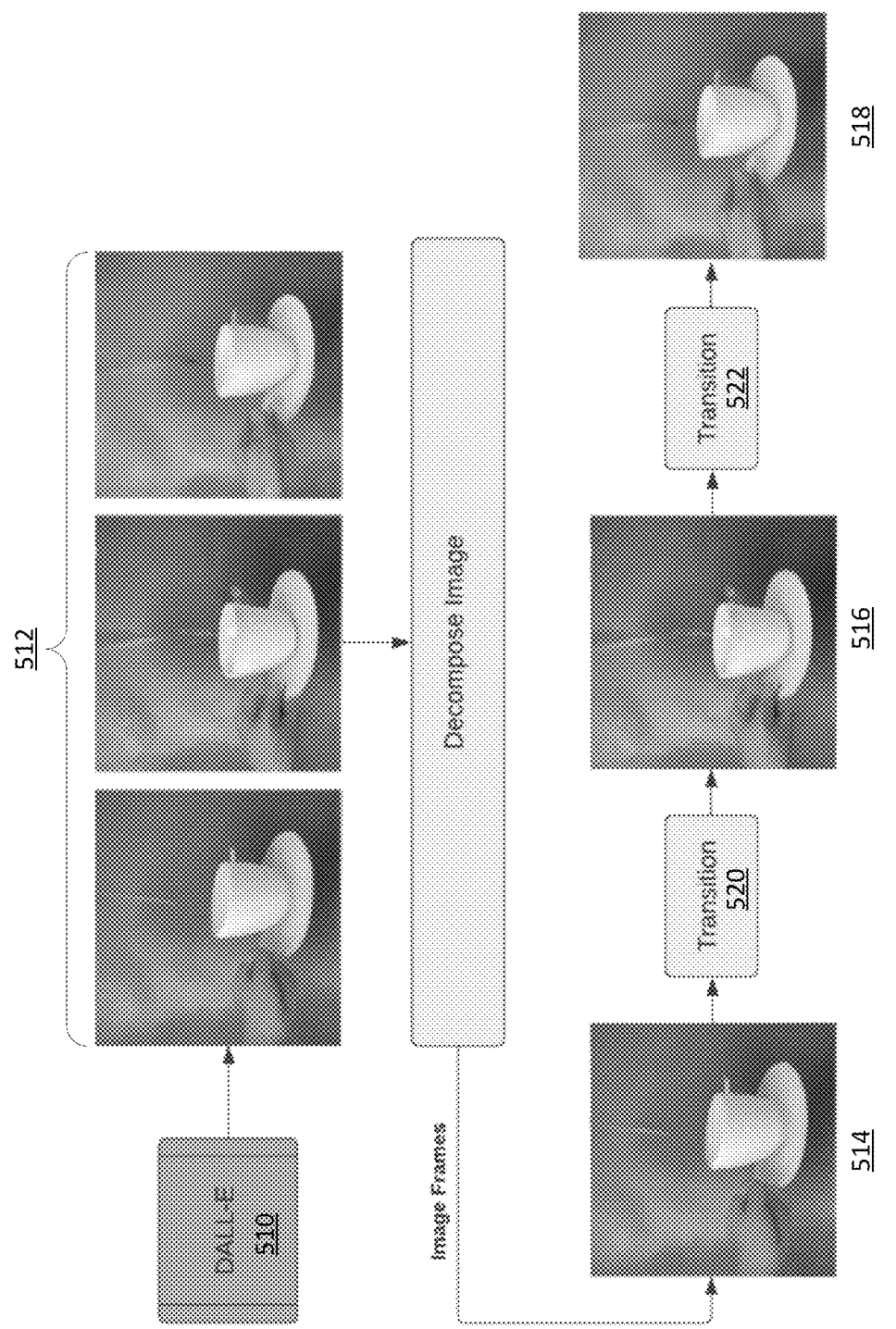
FIG. 5 shows a first example of video composition in accordance with one or more embodiments of the invention.

FIG. 3 shows a flowchart in accordance with one or more embodiments. While the various steps in this flowchart are presented and described sequentially, one of ordinary skill will appreciate that some or all the steps may be executed in different orders, may be combined, or omitted, and some or all the steps may be executed in parallel. Accordingly, embodiments should not be considered limited to the specific number and arrangement of blocks shown in FIG. 5. FIG. 5 provides a general overview of one or more embodiments.

In block 310, a set of text documents is received. The text documents may provide a textual snippet that may be; a series of keywords, client reviews, corporate description, tag lines from a marketing campaign or marketing material. While the customer could specifically provide this information directly, text documents could also be scraped from a customer's website, or obtained from social media. For example, the text documents may be passed as input to a user level application, such as by being uploaded into the user level application, transmitted in a batch process to the user level application, or otherwise provided to the user level application. The user level application may pass the unknown data object to a natural language processing, which triggers execution by the natural language processing. In some embodiments natural language processing may operate as a service or a part of a service that is triggered by receipt of the text documents. Other operations may exist that trigger the execution of the natural processing on the text documents. The text documents provide the initial seeding information from which a series of images can be generated.

In block 312, a summary of the set of text documents is generated using a set of large language machine learning models. In some embodiments, generating the summary further includes generating the summary using a first large language machine learning model. The first large language machine learning model is a generative pre trained transformer model.

For example, GPT-3 or some other Large Language Model attempts to summarize the various sources of context, such as the website, Google Reviews, customer testimonials, etc. This may additionally include direct customer feedback, possibly detailing a theme for the video such as "Promotional" or possibly some "Call to Action". For example, GPT-3 can provide summarization of the particular text documents, resulting in a natural language paragraph a series of completions that were provided to the GPT-3 model in training.

In block 314, a set of keywords is generated from the summary using the set of large language machine learning models. These keywords are distilled from the natural language summaries, reducing the summaries down to a number of keywords that grab the essence of the text documents and enabling the text-to-image model to generate images that are both relevant and reasonable light of the provided text documents.

In some embodiments, the set of keywords is generated using a second large language machine learning model that is different from the first large language machine learning model.

For example, in some embodiments, the set of keywords can be generated by large language models such as GPT-3. Alternatively, for cost and efficiencies, the summary can provide the input for a second language model to perform keyword extraction. The second which model can be a smaller model, such as Bloom, that does not have the processing overhead required by the billions of parameters of the GPT-3 model.

In some embodiments, generating the set of keywords includes generating a sentiment using the set of large language machine learning models. The set of keywords can then be generated from the summary and the sentiment using the set of large language machine learning models. In some embodiments, generating the set of keywords includes generating a topic using the set of large language machine learning models. The set of keywords can then be generated from the summary and the topic using the set of large language machine learning models.

For example, a tokenization of the summary can be performed. The tokens may include sequences of characters or words, such as unigrams, bigram, trigrams or, more generally, n-grams, that form semantic units. A clustering operation can then be performed to identify sentiments and/or topics, with each cluster of tokens representing a topic or sentiment. Various clustering algorithms may be used without departing from the disclosure, such as a short-text clustering algorithm that clusters the terms into a specified number, k, of clusters that form the sentiments and/or topics. The topics of the summary may then be determined through a statistical analysis of relevance of the tokens (e.g., n-grams) associated with the terms under a topic. A ranked list of possible sentiments and/or topics may be obtained, based on the relevance or frequency of the tokens, with highly ranked sentiments and/or topics selected for the set of keywords.

In block 316, an image prompt is generated from the set of keywords using the set of large language machine learning models. For example, taking the set of the words as input, the large language model generates the natural language prompt that can be ingested into the text-to-image model.

After consuming the various keywords, the large language model can generate a specific natural language image prompt that may be similar to:

"Create an oil painting poster in the style of Monet that shows a friendly, traditional, high quality coffee shop."

The exact format of the image prompt can be manipulated based on various prompts and completion supplied when tuning output of the large language model. For example, the image prompt may apply various bracketing and/or grouping to an amalgamation of keywords, resulting in an image prompt that is less grammatically sensical, but can nevertheless be ingested by the text-to-image model to affect the generated image output.

In some embodiments, the set of keywords as a first set of keywords, and generating the image prompt further includes identifying a second set of keywords that are correlated with the set of keywords in a dictionary. The dictionary maintains a series of known keywords that are thematically related and can directly affect the generated image. For example, the dictionary can be a key/value data store that relates various keywords according to thematic topics or semantics. These known collections of keywords can be determined manually, or can based upon categorization machine learning models to create a taxonomy of topics and/or semantic categorical concepts.

Dictionary specifics can be built based upon a feedback loop to language model, providing a reinforcement training of the type images that should be generated. Essentially, dictionary entries provide seed data text-to-image model, influencing the 'feel' of the generated images as well as the progression from image-to-image sequencing.

For example, dictionary entries may include:
traditional→poster, oil painting, Monet, Van Gogh, subdued
modern→Picasso, poster, vibrant, Warhol The listed values can be used to supplement the indexed keyword, thereby providing additional context to the text to model. For example, when the keyword "traditional" is identified, the related words "poster, oil painting, Monet, Van Gogh, subdued" can provide additional input when generating the image prompt. Similarly, the words, "Picasso, poster, vibrant, Warhol" Can be used to supplement the identified keyword, "modern." The image prompt is then generated from the first set of keywords and the second set of keywords—identified from the dictionary—using the set of large language machine learning models.

In block 318, a set of images is generated from the image prompt using a text-to-image machine learning model. In some embodiments, the text-to-image machine learning model is a transformer model.

For example, taking the image prompt as input, the text-to-image model tokenizes the natural language, mapping the tokens to a sequence of discrete rasterized image latent codes based on the learned relationships. The image tokens are then autoregressively decoded into pixels for the generate images.

In block 320, a video clip is generated from the set of images. In some embodiments, the video clip is generated by combining the set of images according to a user-selected template.

For example, to create a montage or video, the subsequent images need to be related and consistent. Again, the generated text will take that into consideration so that the text-to-image model generates a series of images in similar style, theme, and type.

In order to produce a video, the static images are combined in sequence, with transitions, over a certain period of time, stringing the images into a video. For example, videos can be created according to video templates or through a predefined series of video creation steps. Using a video template, the generated images are injected at key placeholders to generate videos having specific purposes and tones. For example, using one such pre-defined template, the renderer would inject the image at the appropriate placeholder. A number of different effects can then be applied within each of the frames, such as for example a kaleidoscope, montage, etc. Other possible variations can be applied or selected based upon other factors selected by the user.

In some embodiments, the video is created through a predefined series of video creation steps (e.g., image→transition→image→transition→titles→closing). For example, a number of transitions (fade, dissolve, ken-burns, etc.) are identified that are appropriate for topics and/or semantics of the images and applied as such. Semantic analysis can be performed on the phrase if no tone is provided by the user. For example, the transitions can be selected based upon the theme or tone of the video. The transitions may be quick cuts for up-tempo, or slow dissolves for more low-key video snippets.

In the case of sequences of images, which may be explicitly requested in the image prompt, the sequence can be divided to produce a series of video frames. In some embodiments, a soundtrack is synchronized with the images—both in total duration and also transitions. Synchronization can be based, for example, upon beats per minute. Titling, comments, emojis, and text may also be added to the video.

In block 322, the video clip is presented. Presenting the video clip may include transmitting the video clip to a downstream system, storing the video clip, or performing another operation.

Figure 4:
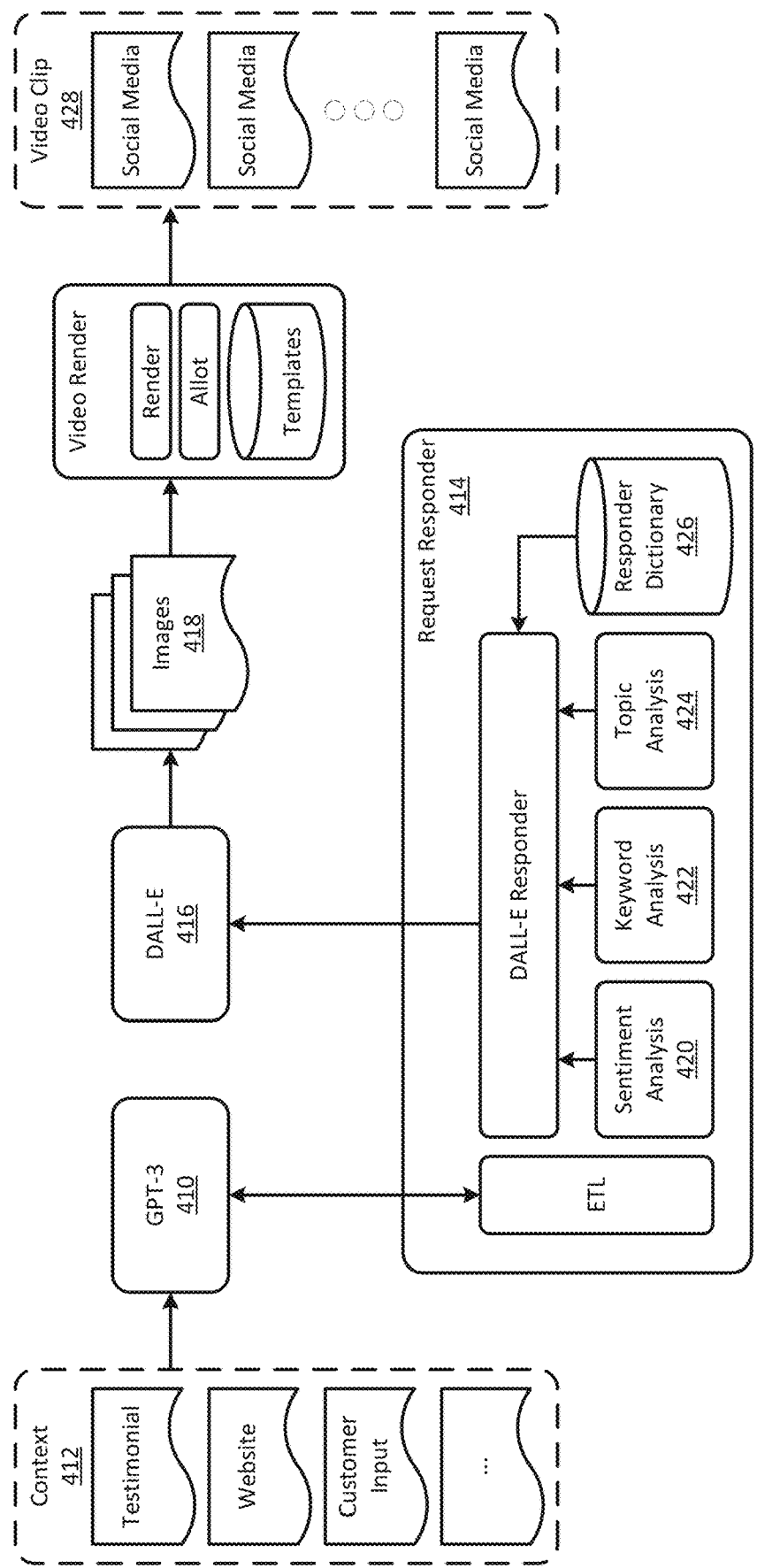
FIG. 4 shows an example schematic diagram of additional system components of the environment shown in FIG. 1, in accordance with one or more embodiments.

The following example is for explanatory purposes only and not intended to limit the scope of the invention. FIG. 4 is an example of architecture that can be used to implement the one were more embodiments. The architecture of FIG. 4 utilizes a pipeline of machine learning models to provide an optimal input into the Transformer based image generator. Generated input results in a consistent series of images that are of similar style and thematically related.

GPT-3 (410) or some other Large Language Model attempts to summarize the various sources of context (412), such as websites, customer reviews, customer testimonials, etc. This may additionally include direct customer feedback, possibly detailing a theme for the video such as "Promotional" or possibly some "Call to Action". GPT-3 (410) is one example of large language models 106 of FIG. 1.

This information is provided to the Request Responder (414). The Request Responder (414) provides a series of specific prompts to the DALL-E (416) text-to image model, producing a series of images (418) that are thematically related and consistent, conveying a common sentiment, theme, or message. The Request Responder (414) is one example of natural language processing (104) of FIG. 1.

Request Responder (414) can utilize several ML models to create the request, including sentiment analysis (420), keyword analysis (422), and topic analysis (424), extracting keywords, sentiment and topics and themes from the summarized context (412). This core portion of the request is further augmented based upon a knowledge base of related terms contained in the Responder Dictionary (426).

The Responder Dictionary (426) is an example of dictionary (122) of FIG. 1. The Responder Dictionary (426) contains various keywords that are thematically related by key which in turn produce a certain type of image by DALL-E. Specific entries in the dictionary can be built based upon trial and error and type of images to be portrayed. The different dictionary entries allow for a prompting of a 'feel' of the images, as well as what the progression from image to image will look like. The responder dictionary (426) is one example of dictionary (122).

After consulting the various components, the Request Responder (414) generates a specific DALL-E request, such as image prompt (114), which is fed into the DALL-E (416) text-to image model. The output of the DALL-E (416) are resulting images. The resulting images (418) can be a series of multiple similar images produced from a single image prompt, allowing a user to select specific images according to personal preferences and desired motif for the video clip. The DALL-E (416) text-to-image model is one example of text-to-image model (118) of FIG. 1.

In order to create a montage or video, the images (418) should be related and consistent. Again, the generated image prompt accounts for the customer's personal preferences and desired motif, so that the series of images (418) is generated according to a similar style, theme, and type. The video clip (428) can be generated either based upon a video template whereby images are injected at key placeholders, or generated through a predefined series of video creation steps (image→transition→image→transition→titles→closing).

For example, a number of transitions (fade, dissolve, ken-burns, etc.) can be identified that are appropriate for the theme and tone of the images, and apply them as such. A soundtrack, possibly selected based upon beats per minute or other relevant criteria, can be synchronized with the images, both in total duration and also transitions. Titling, comments, emojis, and text may optionally be added to the video Referring now to FIG. 5, a first example of video composition is shown in accordance with one or more embodiments of the invention. In the following example, consider the scenario in which the small business is a neighborhood café specializing in coffee. Scraping the business's social media pages and reviews of the business, contextual inputs can be identified such as:

(User entered): Promotion of a new coffee shop
(User entered): Looking for a great place to get your caffeine fix? Look no further than our coffee shop! We have a wide variety of coffee and tea drinks to choose from, plus delicious pastries to go with them. Come on in and try us out today!
Testimonial (web site scrape): I absolutely love my local coffee shop! The coffee is amazing, and the staff is always so friendly. I highly recommend this coffee shop to anyone looking for a great cup of coffee and a great atmosphere.
Testimonial (web site scrape): The coffee at this shop is really good! I'm not a huge coffee drinker, but I really enjoy the coffee here. The staff is also super friendly and always remembers my order. I highly recommend this place!

These textual inputs are processed by a machine learning model, such as one of large language models 106, to obtain the following keywords:

coffee, shop, promote, flavors, pastries

This distilled information (coffee, shop, promote, flavors, pastries) is provided to the Request Responder (414) FIG. 4 that utilizes several machine learning models to extract keywords, sentiment, topics, and themes. The core portion of the request can be further augmented based upon a knowledge base contained in a responder dictionary (426).

The Responder Dictionary contains various keywords that are thematically related based on a desired style for the generated images. For example, the dictionary may include entries such as:

traditional→poster, oil painting, Monet, Van Gogh, subdued
modern→Picasso, poster, vibrant, Warhol After consulting the various components, an image prompt is generated that will produce a series of thematically related and consistent images conveying a common sentiment, theme, or message. Continuing with the current coffee shop example, the image prompt may be similar to:

Form: oil painting poster in the style of Monet
Title: Coffee
Themes: friendly, traditional
Keywords: coffee, shop, promote, favors, pastries As illustrated, the DALL-E model (510) generates a series of images (512), which may be explicitly requested of DALL-E in the image prompt. The images generated by the DALL-E model (510) are divided up, and a series of video frames (514, 516, 518) are produced.

The transitions (520, 522) are selected based upon the theme or tone of the video. For example, the transitions (520, 522) may be quick cuts for up-tempo video clips, while slow dissolves may be selected for more low-key video clips. If a theme or tone is not provided, semantic analysis may be performed on the summary or image prompt to identify transitions appropriate for the video clip.

Figure 6:
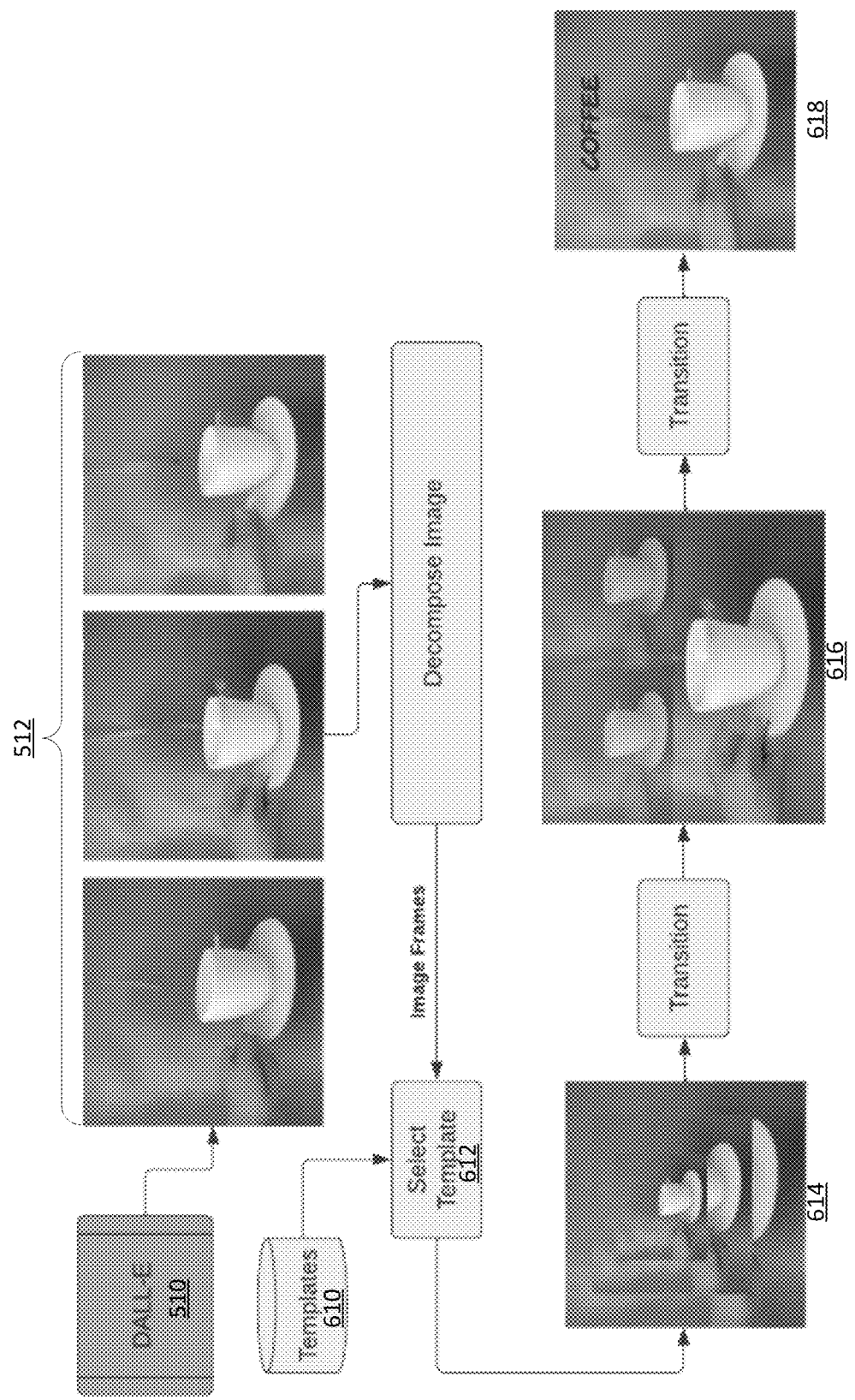
FIG. 6 shows a second example of video composition in accordance with one or more embodiments of the invention.

Referring now to FIG. 6, a second example of video composition is shown in accordance with one or more embodiments of the invention. The rendering method illustrated in FIG. 6 is done through injecting generated images (512) into pre-defined templates (610). Each of the templates (610) have been curated for specific purposes and tones.

For the template embodiment, there may be a number of different effects (614, 616, 618) that are applied within each of the frames, for example, a kaleidoscope, montage, titles etc. The renderer would inject the image at the appropriate place. The illustrated example uses one such pre-defined template (612), however many possible template variations could be selected based upon desired factors, such as purposes, themes and tones.

Figure 7A:
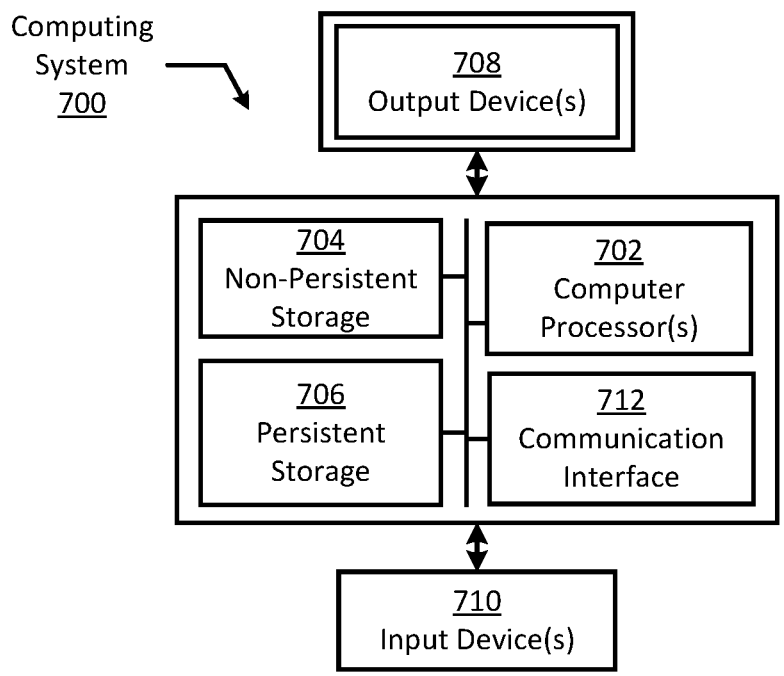
FIG. 7A-B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing unit (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (708) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 7B:
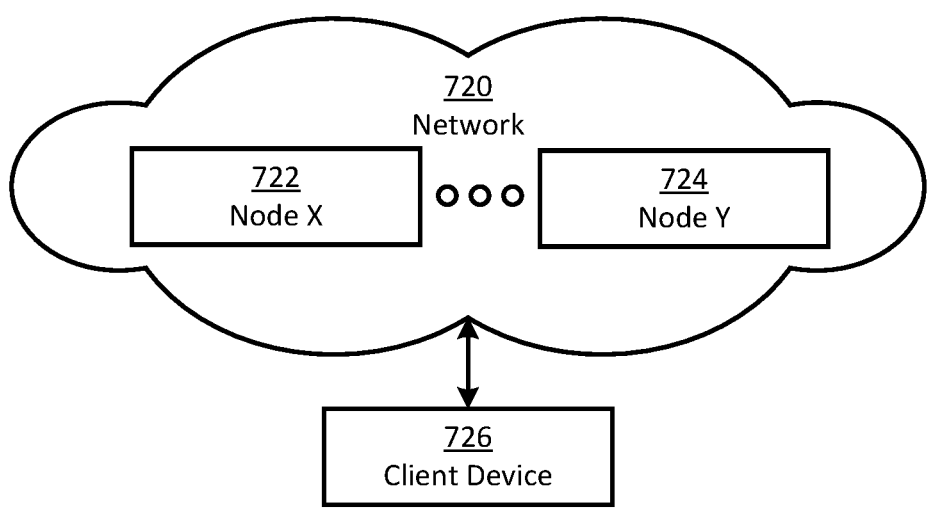

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments of the invention.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving a set of text documents;
generating a summary of the set of text documents by a set of large language machine learning models;
generating a first set of keywords from the summary by the set of large language machine learning models;
generating an image prompt from the first set of keywords by the set of large language machine learning models, wherein generating the image prompt further comprises:
identifying a second set of keywords that are correlated with the first set of keywords in a dictionary; and
generating the image prompt from the first set of keywords and the second set of keywords by the set of large language machine learning models;
generating a set of images from the image prompt by a text-to-image machine learning model;
generating a video clip from the set of images; and
presenting the video clip.

2. The method of claim 1, wherein generating the summary further comprises:
generating the summary by a first large language machine learning model, wherein the first large language machine learning model is a generative pre trained transformer model.

3. The method of claim 2, wherein generating the set of first keywords further comprises:
generating the first set of keywords by a second large language machine learning model, wherein the second large language machine learning model is different from the first large language machine learning model.

4. The method of claim 2, wherein generating the first set of keywords further comprises:
generating a sentiment by the set of large language machine learning models; and
generating the first set of keywords from the summary and the sentiment by the set of large language machine learning models.

5. The method of claim 2, wherein generating the first set of keywords further comprises:
generating a topic by the set of large language machine learning models; and
generating the first set of keywords from the summary and the topic by the set of large language machine learning models.

6. The method of claim 1, wherein the text-to-image machine learning model is a transformer model.

7. The method of claim 1, wherein generating the video clip further comprises:
combining the set of images according to a user-selected template.

8. A system comprising:
a computer processor;
memory; and
instructions stored in the memory and executable by the computer processor to cause the computer processor to perform operations, the operations comprising:
receiving a set of text documents,
generating a summary of the set of text documents by a set of large language machine learning models,
generating a first set of keywords from the summary by the set of large language machine learning models,
generating an image prompt from the first set of keywords by the set of large language machine learning models, wherein generating the image prompt further comprises:
identifying a second set of keywords that are correlated with the first set of keywords in a dictionary; and
generating the image prompt from the first set of keywords and the second set of keywords by the set of large language machine learning models,
generating a set of images from the image prompt by a text-to-image machine learning model,
generating a video clip from the set of images, and
presenting the video clip.

9. The system of claim 8, wherein generating the summary further comprises:
generating the summary by a first large language machine learning model, wherein the first large language machine learning model is a generative pre trained transformer model.

10. The system of claim 8, wherein generating the first set of keywords further comprises:
generating the first set of keywords by a second large language machine learning model, wherein the second large language machine learning model is different from the first large language machine learning model.

11. The system of claim 8, wherein generating the first set of keywords further comprises:
generating a sentiment by the set of large language machine learning models; and
generating the first set of keywords from the summary and the sentiment by the set of large language machine learning models.

12. The system of claim 8, wherein generating the first set of keywords further comprises:
generating a topic by the set of large language machine learning models; and
generating the first set of keywords from the summary and the topic by the set of large language machine learning models.

13. The system of claim 8, wherein the text-to-image machine learning model is a transformer model.

14. The system of claim 8, wherein generating the video clip further comprises:
combining the set of images according to a user-selected template.

15. A computer program product comprising non-transitory computer-readable program code that, when executed by a computer processor of a computing system, causes the computing system to perform the operations of:
receiving a set of text documents;
generating a summary of the set of text documents by a set of large language machine learning models;
generating a set of first keywords from the summary by the set of large language machine learning models;
generating an image prompt from the first set of keywords by the set of large language machine learning models, wherein generating the image prompt further comprises:
identifying a second set of keywords that are correlated with the first set of keywords in a dictionary; and
generating the image prompt from the first set of keywords and the second set of keywords by the set of large language machine learning models;
generating a set of images from the image prompt by a text-to-image machine learning model;
generating a video clip from the set of images; and
presenting the video clip.

16. The computer program product of claim 15, wherein generating the summary further comprises:

generating the summary by a first large language machine learning model, wherein the first large language machine learning model is a generative pre trained transformer model.

17. The computer program product of claim 15, wherein generating the set of first keywords further comprises:
generating a sentiment by the set of large language machine learning models; and
generating a topic by the set of large language machine learning models;
generating the set of first keywords from the summary, the sentiment, and the topic by a second large language machine learning model, wherein the second large language machine learning model is different from the first large language machine learning model.

* * * * *